US006985527B2

(12) United States Patent
Gunter et al.

(10) Patent No.: US 6,985,527 B2
(45) Date of Patent: Jan. 10, 2006

(54) LOCAL CONSTRAINTS FOR MOTION MATCHING

(75) Inventors: Michial Gunter, Fremont, CA (US); David B. Kita, Milpitas, CA (US); Oliver W. Shih, San Jose, CA (US); Carroll Philip Gossett, Mt. View, CA (US)

(73) Assignee: PTS Corporation, San Jose, CA (US)

( * ) Notice: Subject to any disclaimer, the term of this patent is extended or adjusted under 35 U.S.C. 154(b) by 601 days.

(21) Appl. No.: 10/093,072

(22) Filed: Mar. 7, 2002

(65) Prior Publication Data

US 2002/0159524 A1 Oct. 31, 2002

Related U.S. Application Data

(60) Provisional application No. 60/274,079, filed on Mar. 7, 2001.

(51) Int. Cl.
*H04N 7/18* (2006.01)

(52) U.S. Cl. .............................. 375/240.16; 375/240.17

(58) Field of Classification Search ........... 375/240.12, 375/240.13, 240.14, 240.15, 240.16, 240.17, 375/240.24; 348/413
See application file for complete search history.

(56) References Cited

U.S. PATENT DOCUMENTS

| 5,398,068 | A | * | 3/1995 | Liu et al. ................. 375/240.16 |
| 5,608,458 | A | * | 3/1997 | Chen et al. ............. 375/240.14 |
| 5,812,787 | A | * | 9/1998 | Astle .......................... 709/247 |
| 5,876,342 | A | * | 3/1999 | Chen et al. .................. 600/443 |
| 6,049,362 | A | * | 4/2000 | Butter et al. ................ 348/699 |
| 6,266,443 | B1 | * | 7/2001 | Vetro et al. ................. 382/199 |
| 6,373,893 | B1 | * | 4/2002 | Midorikawa ........... 375/240.16 |
| 6,377,623 | B1 | * | 4/2002 | Ra et al. ...................... 375/240 |
| 6,414,995 | B2 | * | 7/2002 | Okumura et al. ....... 375/240.16 |
| 6,418,166 | B1 | * | 7/2002 | Wu et al. .............. 375/240.12 |
| 6,542,547 | B1 | * | 4/2003 | Wong .................... 375/240.17 |
| 6,690,728 | B1 | * | 2/2004 | Chang et al. .......... 375/240.16 |
| 6,807,231 | B1 | * | 10/2004 | Wiegand et al. ....... 375/240.12 |

FOREIGN PATENT DOCUMENTS

| EP | 0 902 396 A2 | 3/1999 |
| EP | 0 951 181 A1 | 10/1999 |
| WO | WO 00/77735 A1 | 12/2000 |

OTHER PUBLICATIONS

Jianliang Shi, et al. "Joint motion estimation and segmentation based on the MDL principle" XP010336192, Oct. 1998, pp. 963-967; Institute of Image Processing and Pattern Recognition, Shanghai, P. R. China.

(Continued)

*Primary Examiner*—Andy Rao
(74) *Attorney, Agent, or Firm*—Okamoto & Benedicto LLP

(57) ABSTRACT

A method and apparatus for estimating the motion of an image region (the "center" region) from a source video frame to a target video frame. The motion estimation is locally constrained in that the estimated motion of the "center region" is affected by the estimated motion of neighboring regions. Advantageously, this may reduce common motion matching problems such as false and ambiguous matches. In one embodiment, the locally-constrained motion estimation may be implemented by biasing an error map of the center region using error maps of the neighboring regions.

22 Claims, 8 Drawing Sheets

OTHER PUBLICATIONS

Carroll Philip Gossett, et al. "Motion Matching Using Local Segment Motion Constraints" U.S. Appl. No. 60/274,079, filed Mar. 7, 2001.

Adityo Prakash, et al. "Method and Apparatus For Efficient Video Processing" U.S. Appl. No. 09/550,705, filed Apr. 17, 2000.

* cited by examiner

LOCAL CONSTRAINTS FOR MOTION MATCHING

CROSS-REFERENCES TO RELATED APPLICATIONS

This patent application claims priority from U.S. Provisional Patent Application No. 60/274,079, filed Mar. 7, 2001, and entitled "Motion Matching Using Local Segment Motion Constraints," the disclosure of which is incorporated herein by reference. This patent application is related to U.S. patent application Ser. No. 09/550,705, filed Apr. 17, 2000 and entitled "Method and Apparatus for Efficient Video Processing," the disclosure of which is incorporated herein by reference. This invention is also related to U.S. patent application Ser. No. 09/591,438, filed Jun. 9, 2000 and entitled "Method and Apparatus for Digital Image Segmentation," the disclosure of which is incorporated herein by reference.

FIELD OF THE INVENTION

The present invention relates in general to image processing. More particularly, it relates to motion matching in video processing.

BACKGROUND OF THE INVENTION

It is desirable to be able to estimate the motion or displacement of an image segment from one video frame to a target video frame. Here the term 'segment' will be used throughout to represent an object, a block, or partial subset of an object. Such motion estimation enables substantial inter-frame compression by reduction of temporal redundancies in video data. Motion estimation is also often referred to as motion matching in that a given segment is 'matched' to a particular location in the target video frame.

Motion matching may typically involve identifying an object in the scene captured in one digital image, identifying that same object in another image and noting the position change from one image to the other. For example, where the video sequence being processed is a soccer match, the process might be used to detect the motion of an object such as the soccer ball. It should be noted that the matching processes described herein are not limited to actual objects in the scene, but might refer to pre-determined blocks or tessellations of the image or even to portions of objects. For example, a video sequence of a beach ball having several solid colored portions of differing colors might be processed with each different colored portion being treated as a different object.

While it need not be the case, matching is often an attempt to "track" an image segment in a video sequence as it moves within the frame of the video sequence. Thus, digital signal pattern matching can be used in various applications such as video compression, medical imaging and object tracking. For example, a digital image processor can determine how a segment moved from one image frame of a video sequence to the next image frame of the video sequence by noting the position of a segment in a first image frame, extracting that segment and matching it against a second image frame, noting the position of a corresponding (matched) segment found in the second image frame and using the difference between the positions as an indication of motion. Often, the motion between two frames of an N-dimensional sequence is described as an N-dimensional vector. Thus, where the video sequence is a sequence of two-dimensional images, the motion of a segment S can be expressed by the two-dimensional vector $u=(\Delta x, \Delta y)$, where $\Delta x$ is the relative displacement of the segment in the horizontal direction and $\Delta y$ is the relative displacement of the segment in the vertical direction. Typically, the units of measurement for the displacements are in pixels.

Motion matching may be problematic and is rather difficult to do efficiently. One problem that often arises in motion matching routines is the occurrence of false matches. The false matches may have a variety of causes, including changes in lighting, sharpness, or even shape of the local object between frames. Another problem that arises is ambiguous matching. Ambiguous matching may occur when multiple displacement vectors result in the same or a similar match between the displaced segment (or object or block) and the underlying pixels. And yet only one of the similar choices is the desired or 'physical' displacement from the viewpoint of a standard observer. Furthermore, some motion matching techniques may work well for image frames with specific characteristics, but they may not work well for image frames with different characteristics.

SUMMARY OF THE INVENTION

A method and apparatus for estimating the motion of an image region (the "center" region) from a source video frame to a target video frame. The motion estimation is locally constrained in that the estimated motion of the "center region" is affected by the estimated motion of neighboring regions. Advantageously, this may reduce common motion matching problems such as false and ambiguous matches. In one embodiment, the locally-constrained motion estimation may be implemented by biasing an error map of the center region using error maps of the neighboring regions.

DESCRIPTION OF THE SPECIFIC EMBODIMENTS

As described below, the problem of ambiguous matching is addressed, in one embodiment according to the present invention, by (a) using segments as the image regions to be matched (instead of arbitrarily selected image regions), and (b) biasing the motion of the segment to be matched with the motion of its neighboring segments. The biasing effectively constrains the segment displacement as a shock absorber constrains displacement of a nearby coupled item. Although using segments is not necessary, it tends to provide better results than using arbitrarily selected image regions.

Figure 1:
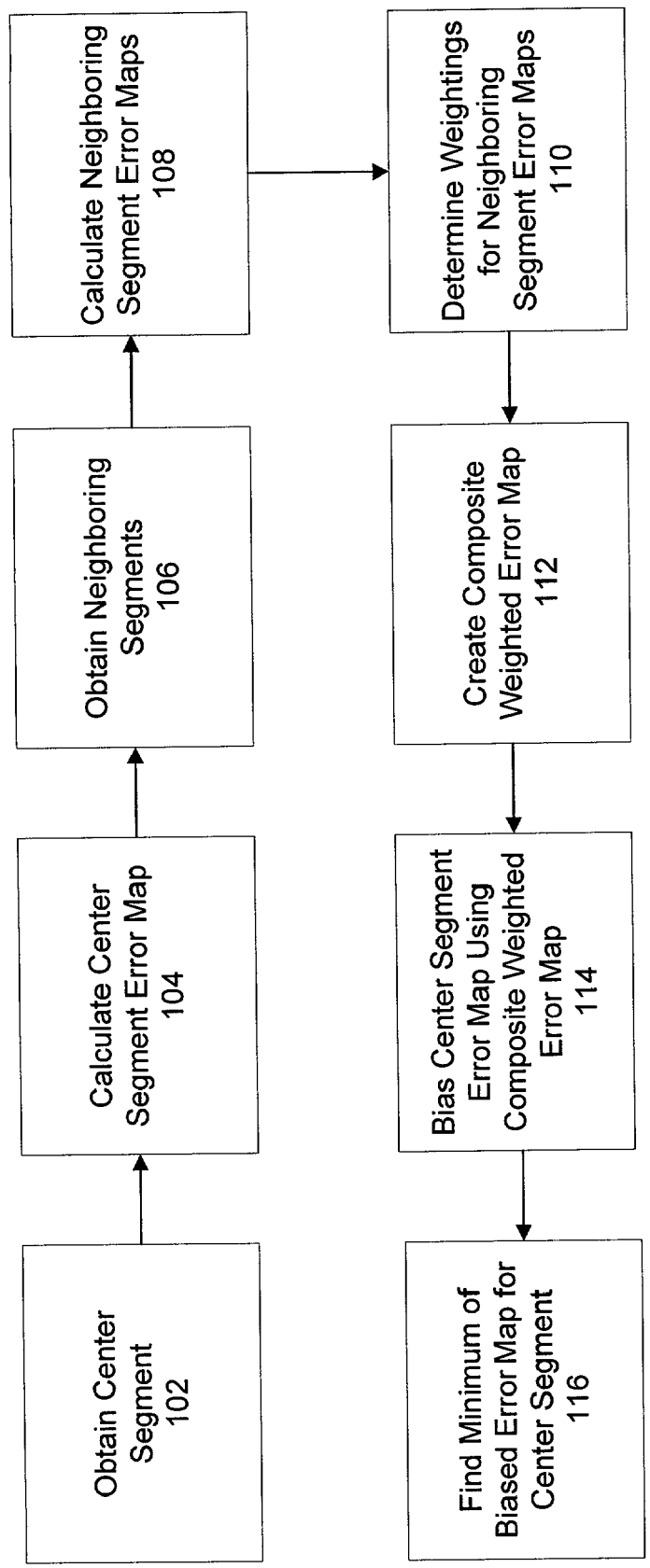
FIG. 1 is a flow chart of a method for performing motion matching with local constraints in accordance with an embodiment of the invention.

FIG. 1 is a flow chart of a method for implementing local constraints for motion matching in accordance with an embodiment of the invention. The method 100 as depicted includes eight steps (102, 104, 106, 108, 110, 112, 114, and 116).

Figure 2:
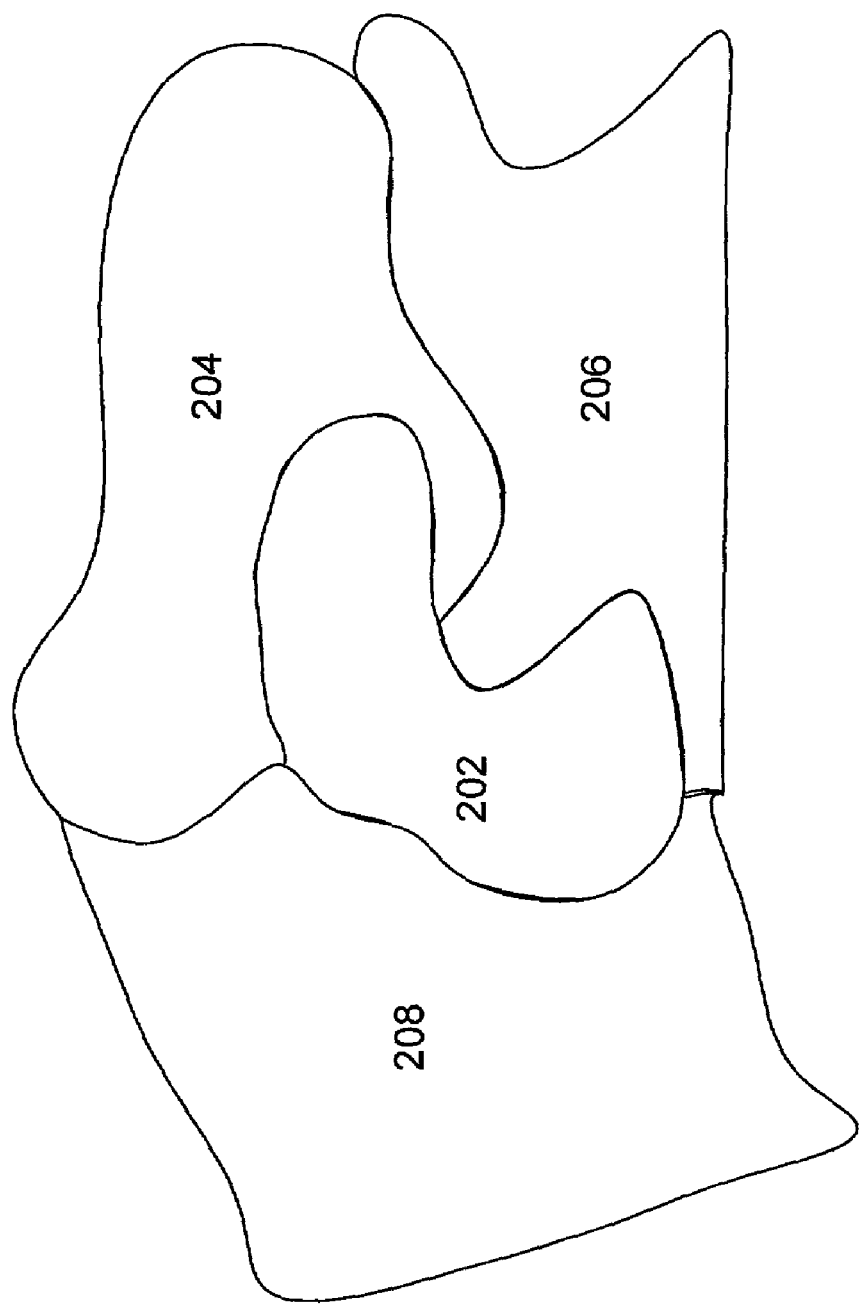
FIG. 2 is an illustration depicting a hypothetical example of a "center" segment and neighboring segments in a source frame.

In the first step 102, a segment is obtained on which the motion matching is to be performed. This segment is herein referred to as the "center" segment. The segment may be obtained from the source image by known image segmentation techniques. An example of one such technique is described in related U.S. patent application Ser. No. 09/591,438, filed Jun. 9, 2000 and entitled "Method and Apparatus for Digital Image Segmentation," the disclosure of which is incorporated herein by reference. A hypothetical example showing a center segment is depicted in FIG. 2 and described below.

In the second step 104, a statistical measure or error function is calculated for the center segment at a set of x and y displacements, usually arrayed in a rectangular domain. The result of these calculations is referred to as an error map. A typical form of the error function is the sum of absolute differences or the L1 error. Other variants of error maps include as error measures various Lp norms (where p is 2, ½, or any positive real number) and any other aggregate statistical scalar function. The error map represents the potential locations in the target image where a match for the center segment might be found. Once again, the error map is created by moving the center segment around to each location in the target image within the allowable matching region (to each candidate motion vector in the search window), subtracting the corresponding pixel values and taking the sum of the absolute values of the differences. The resulting error map represents the quality of the potential match at each point. In general, the lower the value, the better the match at any given point. The calculation of the error map for the center segment is described further below in relation to FIGS. 3 and 4.

In the third step 106, neighboring segments are obtained. These neighboring segments may be obtained by testing other segments for edges coincident with the edges of the center segment, or by other suitable processes. The hypothetical example of FIG. 2 illustrates neighboring segments surrounding a center segment.

In the fourth step 108, a calculation is made of an error map for each of the neighboring segments. As described above, the error map show the likelihood of a match at each point within the target image. The error maps of the neighboring segments will be used to bias the search for the displacement of the center segment from the source image to the target image. The calculation of the error map for a neighboring segment is described further below in relation to FIGS. 5 and 6. Note that the calculation of the error map for the neighbor can be used directly as the center error map when it comes time to treat the given neighbor segment as its own center segment if in fact multiple segments are being processed in the image.

In the fifth step 110, a determination is made of weightings or coupling coefficients for the error maps of the neighboring segments. Each neighboring segment in the source image is assumed to bias the motion matching of the center segment with a certain weight. The weight may be based upon a variety of characteristics, including, but not limited to the following characteristics.

(i) The relative displacement vector (relative motion) between the center segment and each neighboring segment, where, for example, larger relative motions result in lower weights. Using this characteristic makes sense because those neighboring segments with less similar motion to the motion of the center segment would be expected to have less influence in determining the motion matching for the center segment. In one embodiment, the relative motion may be calculated by minimizing the error norms (determining the most likely displacement vector from the error maps) for the unbiased center segment and for the neighboring segments. In another embodiment, the relative motion may be given as part of the information known about the segments.

(ii) The proximity to the center segment in the source image. An annulus of fixed width, or another suitable shape, is determined around the center segment. Each neighboring segment overlaps some fraction of the annulus. The annulus weight is the fraction of the annulus overlapped by the segment. The bigger the overlap, the more the weighting will be for the neighboring segment, due to the larger expected influence on the motion matching for the center segment.

(iii) The color similarity in the source image. The closer the color of a neighboring segment to the center segment, the greater the weighting will be for the neighboring segment, due to the larger expected influence on the motion matching for the center segment.

(iv) The size of the center segment relative to each neighboring segment in the first image. The bigger the center segment is compared to the neighboring segments, the less influence the neighboring segments exert, because of the smaller expected influence on the motion matching for the center segment.

The biasing of the segment displacement may be a function of one or more of the above weighting factors. In one embodiment, the weighting factor "w" of each segment "i" is the product of the weighting of the relative displacement (relative motion), the annulus weight, and the color weight, as shown in the following equation.

$$w_i = w_{motion} * w_{annulus} * w_{color}$$

In the sixth step 112, a composite weighted error map of the neighboring segments may be created. The composite weighted error map may be the sum of the weighted error maps for each neighboring segment. The sum may be normalized by dividing by the total weighting. Such a calculation is shown in the following equation (where the error map is designated Lp though other types of error maps are also possible).

$$Lp_{(neighbors)} = w_i Lp_i / w_i$$

In the seventh step 114, the error map for the center segment is biased by the composite weighted error map by adding them together point by point. This creates a biased error map for the center segment. The composite weighted error map represents the constraining influence of the surrounding neighbor segments on the motion estimation of the center segment. Considering the source and target images to be two frames from a sequence of video frames, the apparent motion of the surrounding neighbor segments essentially helps to steady the apparent motion of the center segment. In other words the motion of the center segment is more coherent with its neighbors where appropriate and the process reduces anomalous differential apparent motion.

In the eighth step 116, the biased error map for the center segment is minimized. This determines the estimated motion vector for the center segment. The composite error of the neighbor segments that was added to the error of the center segment in the previous step 114 has the effect of reinforcing or strengthening the minimum or low point of the error map of the center segment. Therefore, the low point of the biased error map of the center segment is better defined and less ambiguous than the unbiased error of the center segment. The best match for the center segment now occurs where the biased error map is minimized and should better approximate the desired or 'physical' motion of the segment particularly in areas of the image where false or ambiguous matches would otherwise occur.

FIG. 2 is an illustration depicting a hypothetical example of a "center" segment and neighboring segments in a source frame. The center segment 202 as depicted is surrounded by three neighboring segments 204, 206, and 208 in this example. The segment edges defining the boundaries of the various segments may be determined by various known segmentation techniques. These boundaries may, for example, correspond to sharp transitions in color values.

Figure 3:
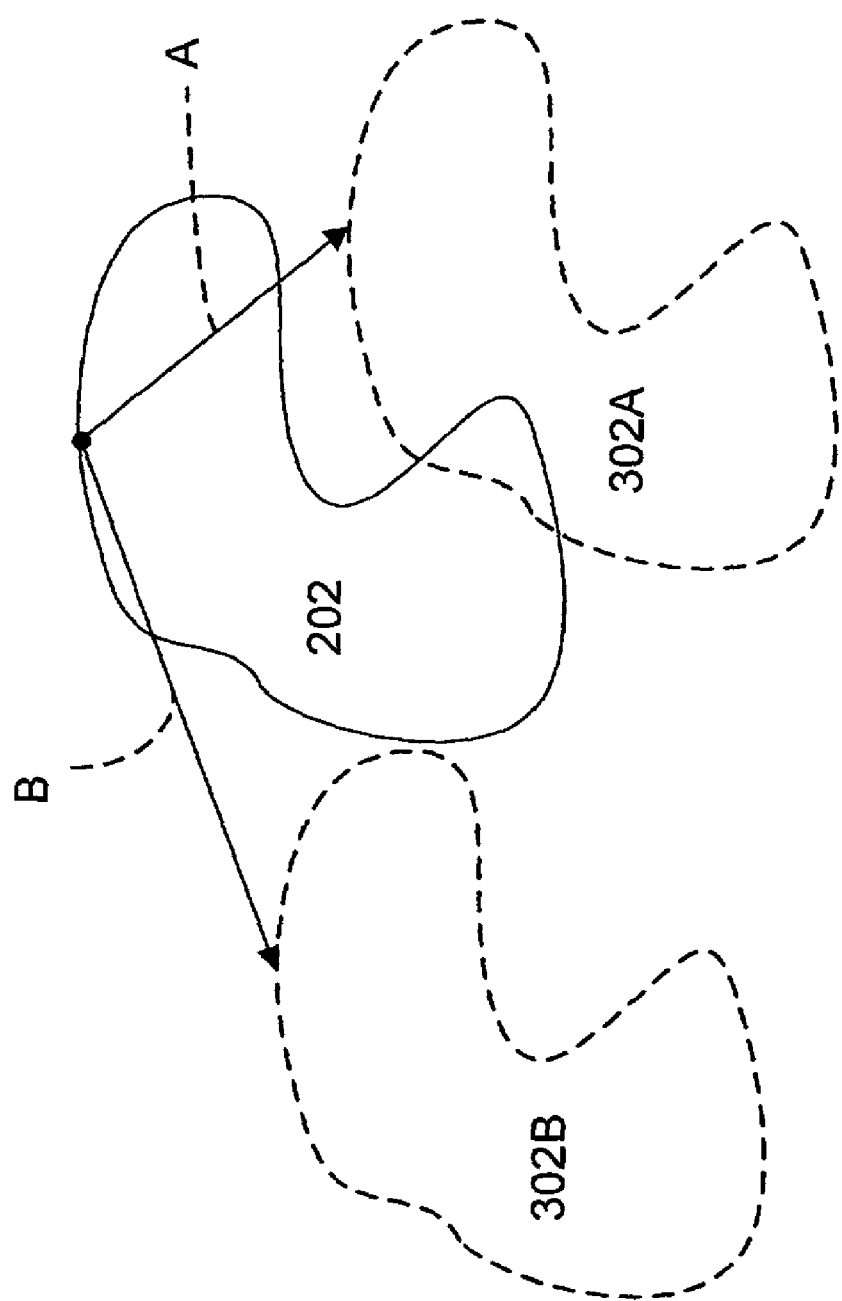
FIG. 3 is an illustration depicting example candidate motion vectors for the center segment.

FIG. 3 is an illustration depicting example candidate motion vectors for the center segment. Motion vectors are sometimes called displacement vectors. Two example candidate vectors A and B are depicted. The first candidate vector A represents a displacement of the center segment from its position in the source frame (shown by 202) to a one position in the target frame (shown by 302A). The second candidate vector B represents a displacement of the center segment from its position in the source frame (shown by 202) to another position in the target frame (shown by 302B). Vectors A and B are just two example vectors of candidate motion vectors.

Figure 4:
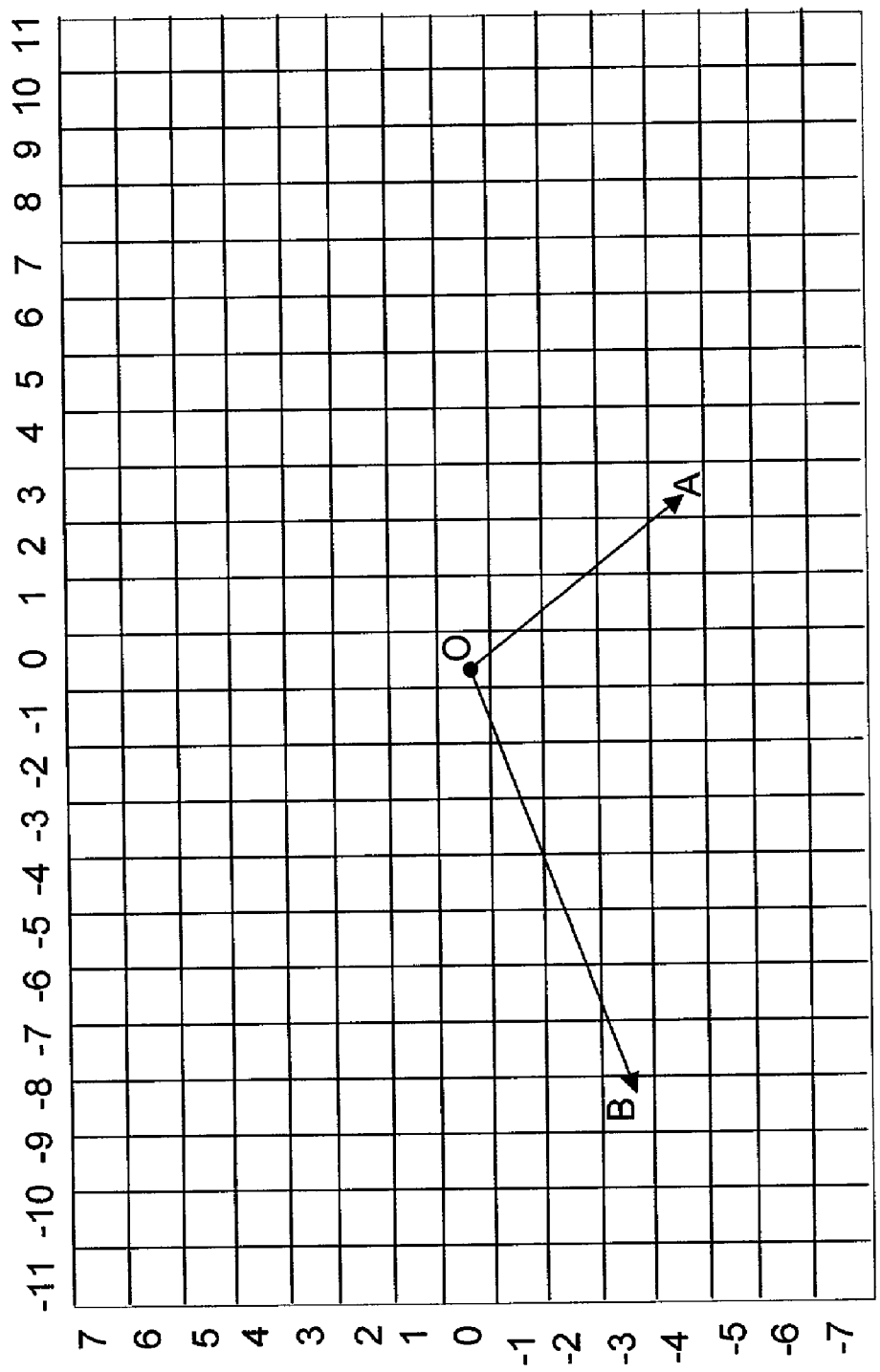
FIG. 4 is a diagram showing the example candidate motion vectors for the center segment within a search window for the motion matching.

FIG. 4 is a diagram showing the example candidate motion vectors for the center segment within a search window for the motion matching. In this diagram, the position of the center segment in the source frame is indicated by the "O" at pixel location x=0, y=0 (0,0). (If there was no motion of the center segment between the source and target frames, then the candidate motion vector would be a null vector remaining at O.) The first candidate motion vector A is depicted in this diagram as going from O to A, where A is at relative pixel location (3, −4). The second candidate motion vector B is depicted in this diagram as going from O to B, where B is at relative pixel location (−3, −8). In this example, the search window may be the rectangle shown in the figure [i.e., the rectangle defined by (11,7) in the upper right corner and (−11 ,−7) in the lower left corner]. The error map for the center segment may be generated by displacing the center segment by each candidate displacement vector in the search window and calculating the sum of absolute differences (SAD) between the source pixels of the center segment and the underlying target pixels.

Figure 5:
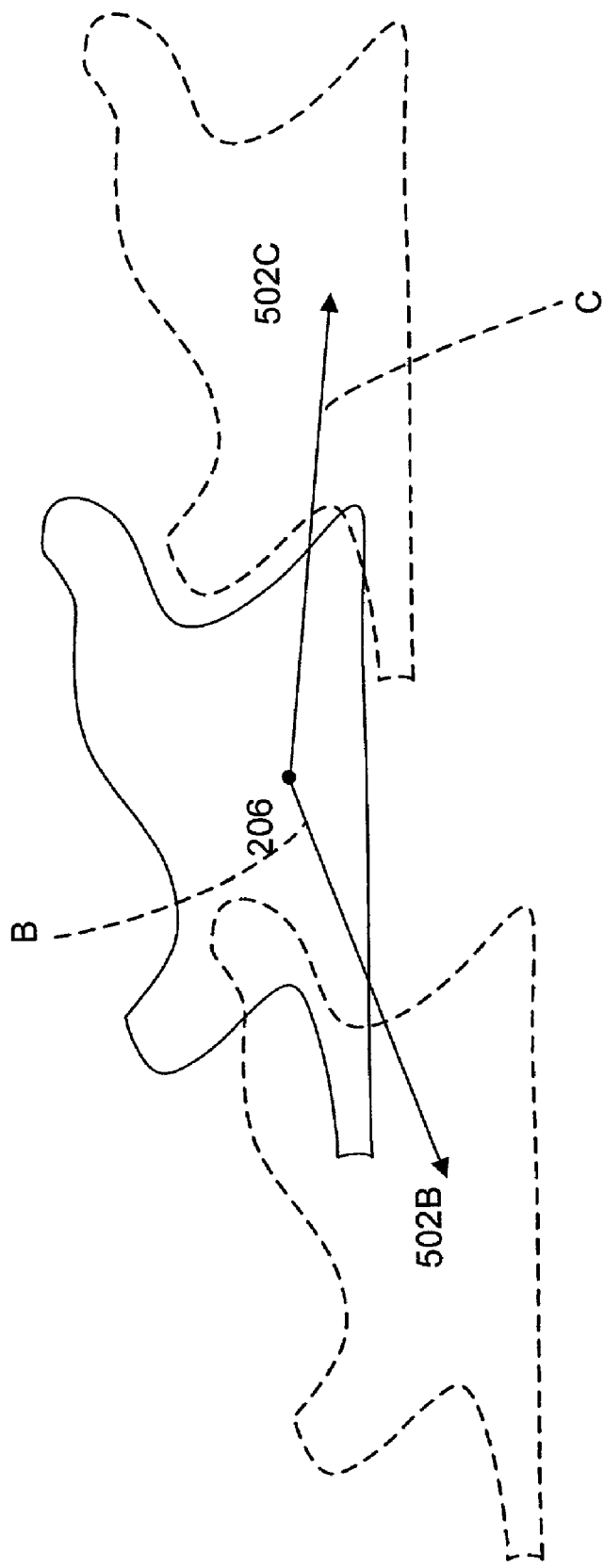
FIG. 5 is an illustration depicting example candidate motion vectors for a neighboring segment.

FIG. 5 is an illustration depicting example candidate motion vectors for a neighboring segment. Here, the second neighboring segment 206 from FIG. 2 is used for example purposes. Two example candidate vectors B and C are depicted. The first candidate vector B represents a displacement of the center segment from its position in the source frame (shown by 206) to one position in the target frame (shown by 502B). The second candidate vector C represents a displacement of the center segment from its position in the source frame (shown by 206) to another position in the target frame (shown by 502C). Vectors B and C are just two example vectors of candidate motion vectors.

Figure 6:
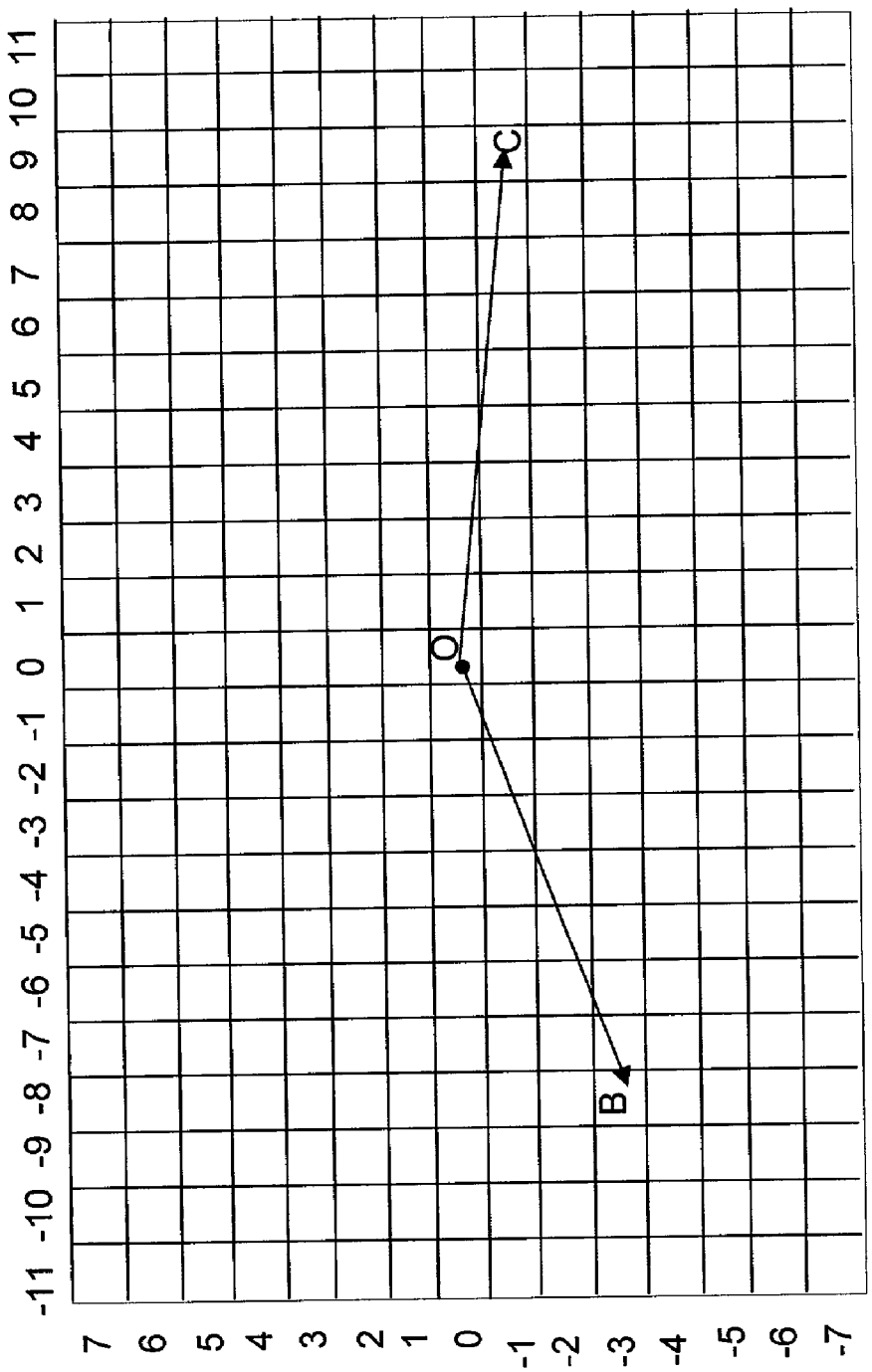
FIG. 6 is a diagram showing the example candidate motion vectors for the neighboring segment within a search window for the motion matching.

FIG. 6 is a grid diagram showing the example candidate motion vectors for the neighboring segment within a search window for the motion matching. As in FIG. 4, the position of the neighboring segment 206 in the source frame is indicated by the "O" at pixel location x=0, y=0 (0,0). (If there was no motion of the neighbor segment between the source and target frames, then the candidate motion vector would be a null vector remaining at O.) The first candidate motion vector B is depicted in this diagram as going from O to B, where B is at relative pixel location (−3, −8). The second candidate motion vector C is depicted in this diagram as going from O to C, where C is at relative pixel location (9, −1). In this example, the search window may again be the rectangle shown in the figure. The error map for the neighboring segment 206 may be generated by displacing the neighboring segment 206 by each candidate displacement vector in the search window and calculating the sum of absolute differences (SAD) between the source pixels of the neighboring segment 206 and the underlying target pixels. Of course, the process may be applied to each neighboring segment, not just to one of them.

Figure 7:
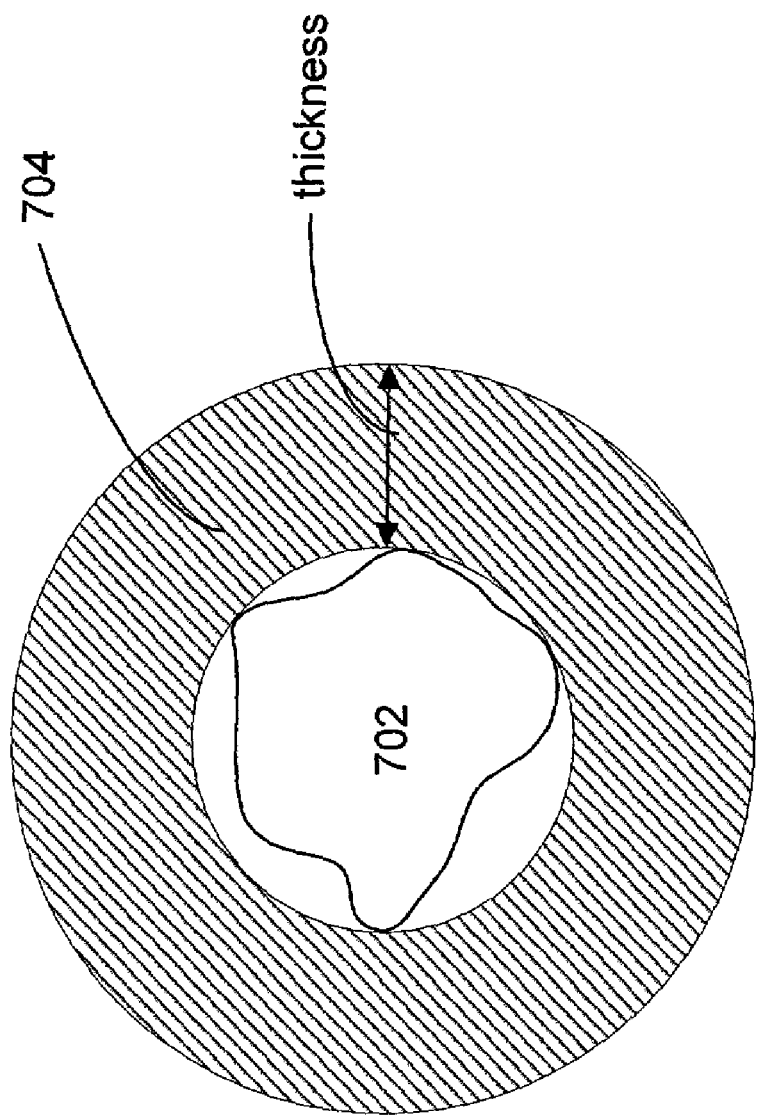
FIG. 7 is a diagram showing an annulus around an example center segment in accordance with an embodiment of the invention.

FIG. 7 is a diagram showing an annulus around an example center segment in accordance with an embodiment of the invention. The example center segment 702 is shown surrounded by the annulus 704. In one embodiment, the annulus 704 may have a thickness that is determined by a measure of the size of the center segment 702. For example, a larger size of the center segment 702 may correspond to a greater thickness of the annulus 704. In the embodiment illustrated, the overlap between pixels within the annulus 704 and the neighboring segments would determine the proximity contribution to the weighting.

Figure 8:
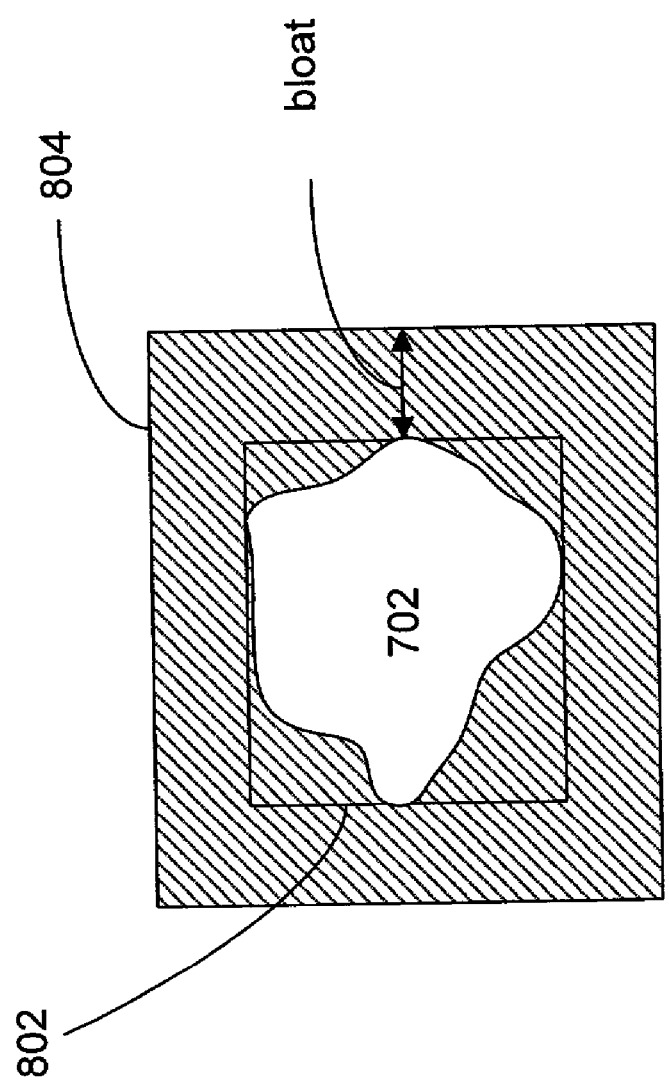
FIG. 8 is a diagram showing a bloated bounding box around an example center segment in accordance with an embodiment of the invention.

FIG. 8 is a diagram showing a bloated bounding box around an example center segment in accordance with an embodiment of the invention. A bounding box 802 around the center segment 702 is shown. That bounding box 802 is bloated by a "bloat" distance that is shown in the figure to create a bloated bounding box 804. In the embodiment illustrated, the overlap between any pixels within the bloated bounding box 804 and the neighboring segments would determine the proximity contribution to the weighting. In another embodiment, pixels within the bounding box 802 would not be counted, such that only pixels inside the bloated bounding box 804 and outside the bounding box 802 would be used in calculating the overlap. This alternate embodiment is similar to the annulus embodiment described above in relation to FIG. 7.

A system or method for displacement determination (motion matching, in the case of video sequences) can be modified from the above teachings.

For example, a shock absorber routine, similar to the one described above, may be used only as a refinement. If the processor is given the "unconstrained" motion vector, then the shock absorber routine may be limited to refining the motion vector within a small surrounding area. In other words, instead of finding the locally-constrained motion vector for the center segment directly from the biased error maps of the center segment, the unconstrained motion vector is first found from the error map of the center segment without any biasing from the neighboring segments. Then the unconstrained motion vector is refined further by examining the error map of the center segment for motion vectors close to the unconstrained motion vector but this time biased by neighboring segments. This is less computational since the error maps of the neighboring segments need only be computed for a smaller range of motion centered about the unconstrained motion vector.

In another example, the size of the annulus or other shape is based upon the size of the center segment. In a further example, the annulus may be replaced with a shape that is not circular shaped. In a still further example, the weighting region may be a bloated bounding box. In a further embodiment, the bounding box varies with the size of the segments.

In another example, the neighboring error maps are combined directly with the unbiased error of the center segment instead of creating a composite neighbor error first. In other words, in the above-described embodiment, the error maps for each neighbor i are weighted with weight $w_i$ to create the composite error map (denoted $L_{composite}$ below).

$$L_{composite} = \frac{Sum_i(w_i * Lp\_i)}{Sum_i(w_i)}$$

which is then added to the unbiased Lp_center with weight W to generate the biased error map ($L_{final}$)

$$L_{final} = \frac{Lp\_center + W * L_{composite}}{1 + W}$$

or written out in full:

$$L_{final} = \frac{Lp\_center + W \frac{Sum_i(w_i * Lp\_i)}{Sum_i(w_i)}}{1 + W}$$

This is different from the alternate embodiment where combining the neighboring error maps directly to the unbiased error map. In this embodiment, the biased error map is given by $$L_{final} = \frac{Lp\_center + Sum_i(w_i * Lp\_i)}{1 + Sum_i(w_i)}$$

Yet another example is to include more distant neighbor segments in addition to the nearest neighbor segments surrounding the center segment.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for estimating motion of a first region from an original video frame to a target video frame, the method comprising:
   calculating an error map for the first region;
   calculating error maps for neighboring regions around the first region;
   weighting the error maps for the neighboring regions relative to each other;
   biasing the error map for the first region using the weighted error maps for the neighboring regions; and
   determining the estimated motion for the first region using the biased error map.

2. The method of claim 1, wherein the neighbor regions are adjacent to the first region in the original video frame.

3. The method of claim 1, wherein the error maps are calculated using sums of absolute differences or L1 error.

4. The method of claim 1, wherein the error maps are calculated using an Lp norm where p is a positive real number.

5. The method of claim 1, wherein the error maps are calculated using any aggregate statistical scalar function as an error measure.

6. The method of claim 1, further comprising:
   calculating a composite weighted error map from the weighted error maps for the neighboring regions; and
   using the composite weighted error map in biasing the error map for the first region.

7. The method of claim 6, wherein relative motion between each of the neighboring regions and the first region contributes to the weighting.

8. The method of claim 6, wherein proximity of each of the neighbor regions to the first region contributes to the weighting.

9. The method of claim 8, wherein the proximity comprises an amount of overlap between the neighbor region and an annulus-like area surrounding the first region.

10. The method of claim 8, wherein the proximity comprises an amount of overlap between the neighbor region and a bloated bounding box surrounding the first region.

11. The method of claim 6, wherein a color similarity between each of the neighboring regions and the first region contributes to the weighting.

12. The method of claim 6, wherein a relative size between each of the neighboring regions and the first region contributes to the weighting.

13. The method of claim 6, wherein the weighting comprises a product of multiple contributing factors, and wherein the multiple contributing factors include a relative motion measure, a proximity measure, and a color similarity measure.

14. The method of claim 1, wherein the first region and the neighboring regions comprise segments obtained by an image segmentation process.

15. The method of claim 1, wherein the first region and the neighboring regions comprise arbitrarily-shaped regions.

16. The method of claim 1, wherein the source frame and the target frame comprise video frames from a same group of pictures (GOP).

17. The method of claim 1, further comprising:
    determining the estimated motion by finding a local minimum in the biased error map for the first region.

18. The method of claim 17, wherein the local minimum is required to be below a threshold value in order to determine an acceptable estimation.

19. An apparatus for estimating motion of a first region from an original video frame to a target video frame, the apparatus comprising:
    means for calculating an error map for the first region;
    means for calculating error maps for neighboring regions around the first region;
    means for weighting the error maps for the neighboring regions relative to each other;
    means for biasing the error map for the first region using the weighted error maps for the neighboring regions; and
    means for determining the estimated motion for the first region using the biased error map.

20. The apparatus of claim 19, wherein the apparatus comprises an encoder.

21. The apparatus of claim 19, wherein the apparatus comprises a decoder configured to receive video information from an encoder.

22. A method for estimating motion of a first region from an original video frame to a target video frame, the method comprising:
    calculating an unbiased error map for the first region;
    determining an unconstrained estimated motion for the first region using the unbiased error map;
    calculating error values in the vicinity of the unconstrained estimated motion for neighboring regions around the first region;
    weighting the calculated error values for the neighboring regions relative to each other; and
    adjusting the unconstrained estimated motion for the first region using the weighted error values for the neighboring regions to determine a locally-constrained estimated motion for the first region.

* * * * *